(12) United States Patent
Manuselis et al.

(10) Patent No.: US 9,501,472 B2
(45) Date of Patent: Nov. 22, 2016

(54) SYSTEM AND METHOD FOR DUAL SCREEN LANGUAGE TRANSLATION

(71) Applicant: Intel Corporation, Santa Clara, CA (US)

(72) Inventors: Nicholas M. Manuselis, El Dorado Hills, CA (US); John J. Valavi, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 679 days.

(21) Appl. No.: 13/730,894

(22) Filed: Dec. 29, 2012

(65) Prior Publication Data

US 2014/0188455 A1   Jul. 3, 2014

(51) Int. Cl.
| | |
|---|---|
| G06F 17/28 | (2006.01) |
| H04R 1/40 | (2006.01) |
| G10L 21/00 | (2013.01) |
| G10L 25/00 | (2013.01) |
| G10L 15/00 | (2013.01) |
| G06F 3/041 | (2006.01) |
| G09G 5/00 | (2006.01) |
| H04N 5/60 | (2006.01) |
| H04N 7/14 | (2006.01) |
| H04R 3/00 | (2006.01) |
| H03B 29/00 | (2006.01) |
| H04R 5/02 | (2006.01) |

(52) U.S. Cl.
CPC ............. *G06F 17/289* (2013.01); *H04R 1/406* (2013.01); *H04R 2499/11* (2013.01); *H04R 2499/15* (2013.01)

(58) Field of Classification Search
USPC ........ 704/3, 277, 246, 271, 270, 2; 348/152, 348/738; 349/69; 455/566; 345/156, 173, 345/650; 379/202.01; 367/121; 381/92, 381/71.11, 302

See application file for complete search history.

(56) References Cited

U.S. PATENT DOCUMENTS

| | | | | |
|---|---|---|---|---|
| 5,357,355 | A * | 10/1994 | Arai ................................ 349/69 |
| 6,049,607 | A * | 4/2000 | Marash .................. H04R 3/005 367/121 |
| 6,993,474 | B2 * | 1/2006 | Curry et al. ....................... 704/3 |
| 7,792,676 | B2 * | 9/2010 | Klinefelter et al. .......... 704/271 |
| 8,243,902 | B2 * | 8/2012 | Caspi .................... H04M 3/385 379/142.05 |
| 9,076,450 | B1 * | 7/2015 | Sadek ..................... G10L 15/34 |
| 2005/0195988 | A1 * | 9/2005 | Tashev ................... H04R 3/005 381/92 |
| 2006/0104458 | A1 * | 5/2006 | Kenoyer .................. H04N 7/14 381/92 |
| 2006/0136227 | A1 * | 6/2006 | Mizutani et al. ............. 704/277 |
| 2008/0109208 | A1 * | 5/2008 | Curry et al. ...................... 704/3 |

(Continued)

*Primary Examiner* — Pierre-Louis Desir
*Assistant Examiner* — Neeraj Sharma
(74) *Attorney, Agent, or Firm* — Grossman, Tucker, Perreault & Pfleger, PLLC

(57) ABSTRACT

Generally, this disclosure provides systems and methods to facilitate real-time language translation between two speakers. A system may include an audio beamforming microphone configured to detect speech in a first language from a first speaker and to detect speech in a second language from a second speaker; a language translation module configured to translate the speech in the first language to text in the second language and to translate the speech in the second language to text in the first language; and a display element configured with a first display element side and a second display element side and further configured to display the text in the first language on the first display element side and to display the text in the second language on the second display element side.

12 Claims, 7 Drawing Sheets

(56) References Cited

U.S. PATENT DOCUMENTS

| | | | | |
|---|---|---|---|---|
| 2008/0259731 | A1* | 10/2008 | Happonen | G10K 11/34 367/121 |
| 2009/0055178 | A1* | 2/2009 | Coon | 704/246 |
| 2011/0019835 | A1* | 1/2011 | Schmidt | G10L 21/0272 381/71.11 |
| 2011/0115987 | A1* | 5/2011 | Kubo | H04N 5/607 348/738 |
| 2011/0157300 | A1* | 6/2011 | Solvang | G01S 3/8083 348/14.16 |
| 2012/0075405 | A1* | 3/2012 | Sakai | H04N 7/15 348/14.01 |
| 2012/0308056 | A1* | 12/2012 | Nakayama | B60Q 9/008 381/302 |
| 2013/0120459 | A1* | 5/2013 | Dickinson | G06F 1/163 345/650 |
| 2013/0222271 | A1* | 8/2013 | Alberth | G06F 1/163 345/173 |
| 2013/0253900 | A1* | 9/2013 | Escobedo | G10L 13/043 704/2 |
| 2013/0293502 | A1* | 11/2013 | Kitatani | G06F 3/0488 345/173 |
| 2013/0294616 | A1* | 11/2013 | Mulder | H04R 3/005 381/71.1 |
| 2013/0304476 | A1* | 11/2013 | Kim | H04N 7/15 704/270 |
| 2014/0098233 | A1* | 4/2014 | Martin et al. | 348/152 |
| 2014/0152538 | A1* | 6/2014 | Ham | G06F 3/012 345/156 |

* cited by examiner

SYSTEM AND METHOD FOR DUAL SCREEN LANGUAGE TRANSLATION

FIELD

The present disclosure relates to language translation and, more particularly, to dual screen language translation with beam forming microphones.

BACKGROUND

As commerce becomes increasingly globalized, business transactions more frequently involve international parties. These parties often speak different languages and thus face barriers to efficient communication. Human language translators are typically employed, but this process can be time consuming, expensive and error prone. Occasionally the parties to a conversation will think that they understand each other when in reality they do not. What is needed, therefore, is a way to improve clarity of understanding between parties that speak different languages in an efficient and cost effective manner.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods to facilitate real-time language translation between two speakers. A beamforming microphone may be employed to detect the speech of each speaker while reducing background noise. A language translation module may translate the speech, of one language, to text of the other language. The translated text may then be display elemented on each side of a dual sided display element so that each speaker views the translated text of the other speaker's speech. The translation and display may be performed in real-time to enable efficient communication between the speakers.

Figure 1:
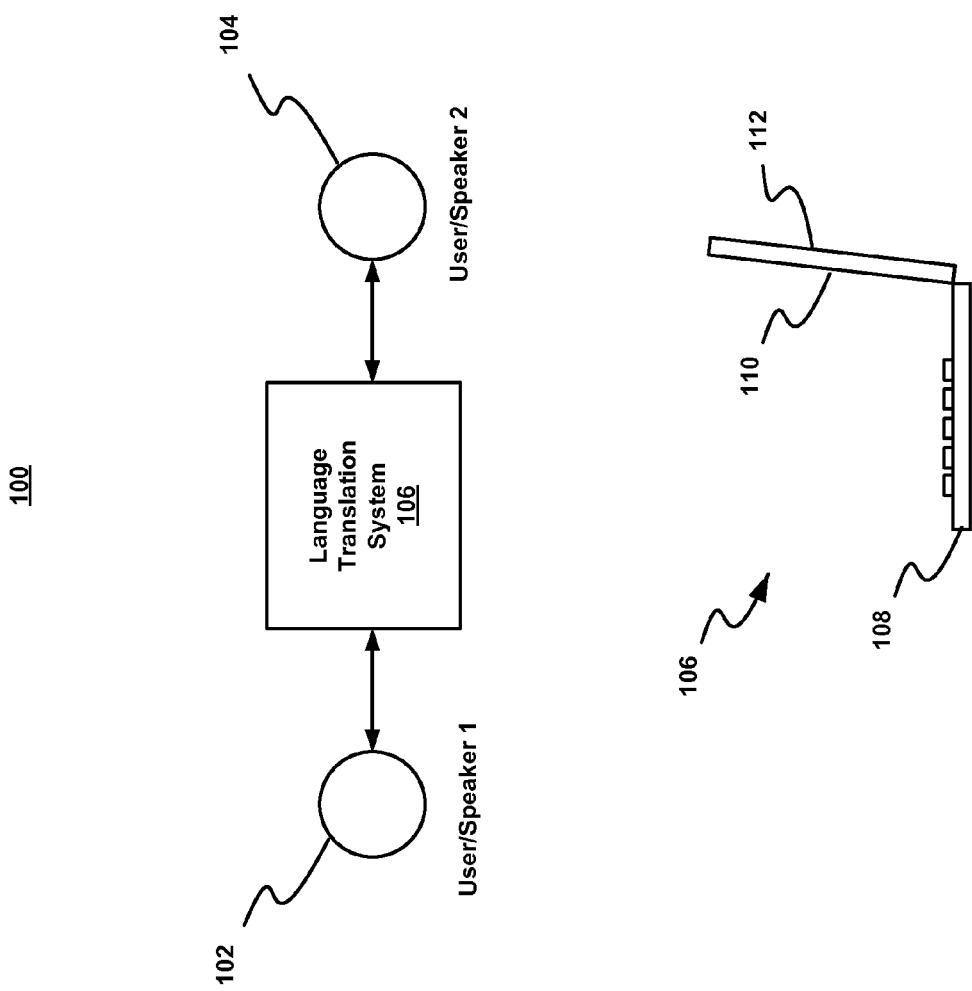
FIG. 1 illustrates a top level system diagram of one example embodiment consistent with the present disclosure.

FIG. 1 illustrates a top level system diagram 100 of one example embodiment consistent with the present disclosure. A first user or speaker 102 and a second user or speaker 104 are shown to interact with a language translation system 106, which will be described in greater detail below. In some embodiments, the language translation system 106 may be implemented on a laptop computing device, tablet, notebook, workstation, phone, smartphone, ultrabook or any other mobile computing device or suitable device that comprises a dual screen display element capable of providing a viewing screen to each of the users/speakers 102, 104. For example, the lift-open cover/screen of a laptop, ultrabook or notebook computer 108 may provide a dual sided display element that includes a first display element 110 on the inside of the cover and a second display element 112 on the outside of the cover. In some embodiments, there may be a keyboard or other suitable input device (not shown) provided on both sides of the system 106.

Figure 2:
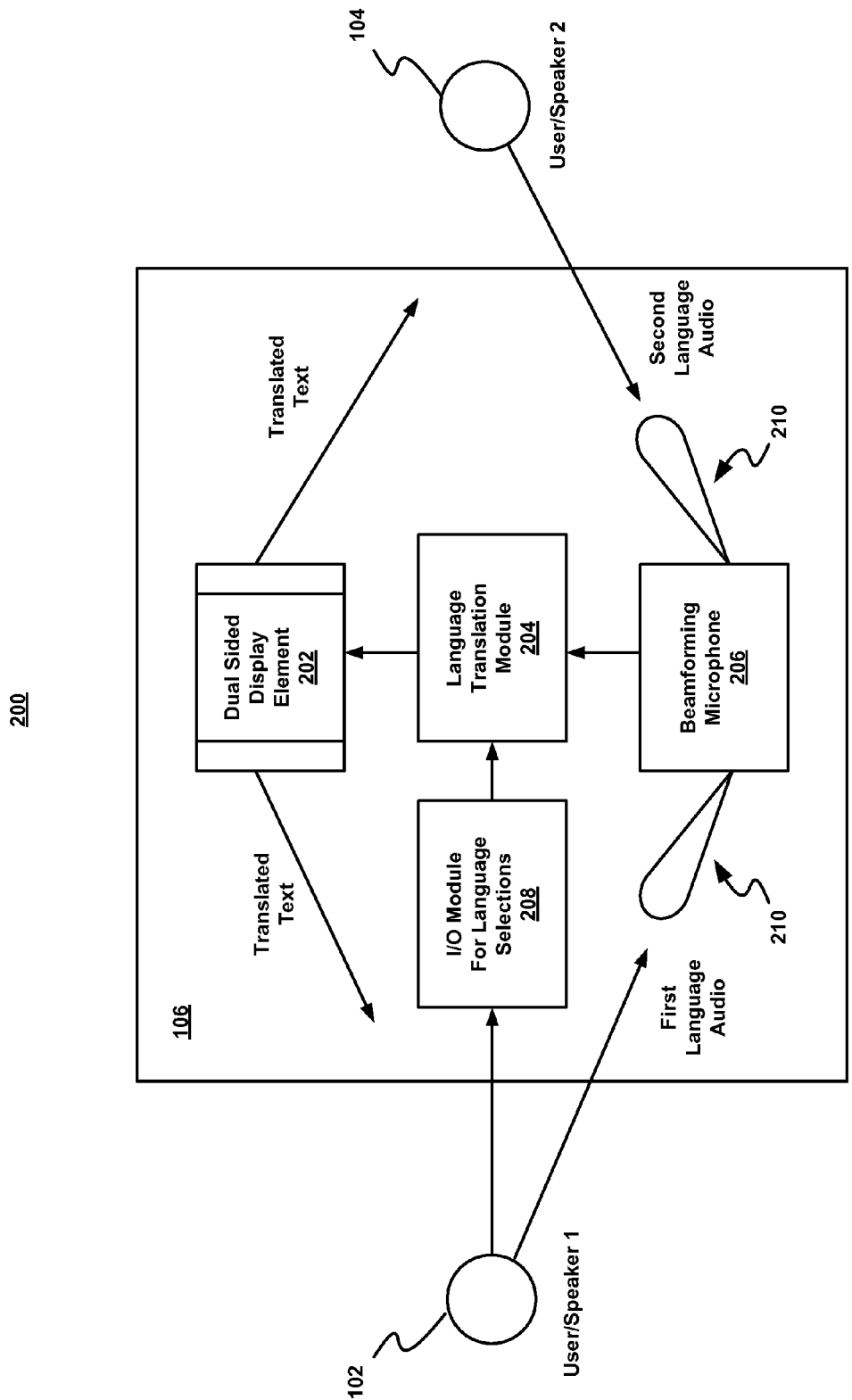
FIG. 2 illustrates a block diagram of one example embodiment consistent with the present disclosure.

FIG. 2 illustrates a block diagram 200 of one example embodiment consistent with the present disclosure. The language translation system 106 is shown to include a beamforming microphone 206, a language translation module 204, a dual sided display element 202 and an Input/Output (I/O) module 208. The beamforming microphone 206 may be configured to steer audio beams 210 in a direction towards each of the users/speakers 102, 104. The steered beams 210 may reduce background noise and improve language translation accuracy. In some embodiments, the steered beams 210 may be used to detect which speaker is speaking at a given time, based on the direction of the audio for example. This information may then be used to determine which of the display elements the translated text will be displayed upon.

Speech may be detected as an audio signal by the beamforming microphone 206 and identified or associated with one of the speakers 102, 104. In some embodiments, the detected speech may be processed by a speech recognition engine (not shown) to transform the audio signal into a text format which is then provided to the language translation module 204. In other embodiments, the speech recognition task may be performed within the language translation module 204.

The language translation module 204 translates the speech from a first language, as spoken by the first speaker 102 into a second language that the second speaker 104 may understand. Similarly, the speech from the second user 104, in the second language, may be translated into the first language that the first user 102 may understand. In some embodiments, the first and second languages may be initially specified by either of the users (or another party) through an I/O module provided for language selection 208. The I/O module may include a keyboard, mouse, touchscreen, gesture input/detection or any other suitable I/O device.

The translated languages, in the form of text, may be displayed on the dual-sided display element 202 such that each user 102, 104 views the translation of the other user's speech in real-time or near real-time. This system may be used to overcome language barriers to provide for an efficient conversational exchange between users. The system may also be used to assist in the training of human language translators or for other educational purposes.

The language translation module 204 (and/or speech recognition engine) may be configured to use any known voice analyzing methodology to identify particular voice patterns within the voice data. For example, the module may include custom, proprietary, known and/or after-developed recognition and translation code (or instruction sets), hardware, and/or firmware that are generally well-defined and operable to receive speech data, recognize the speech and translate the speech into a desired foreign language.

Figure 3:
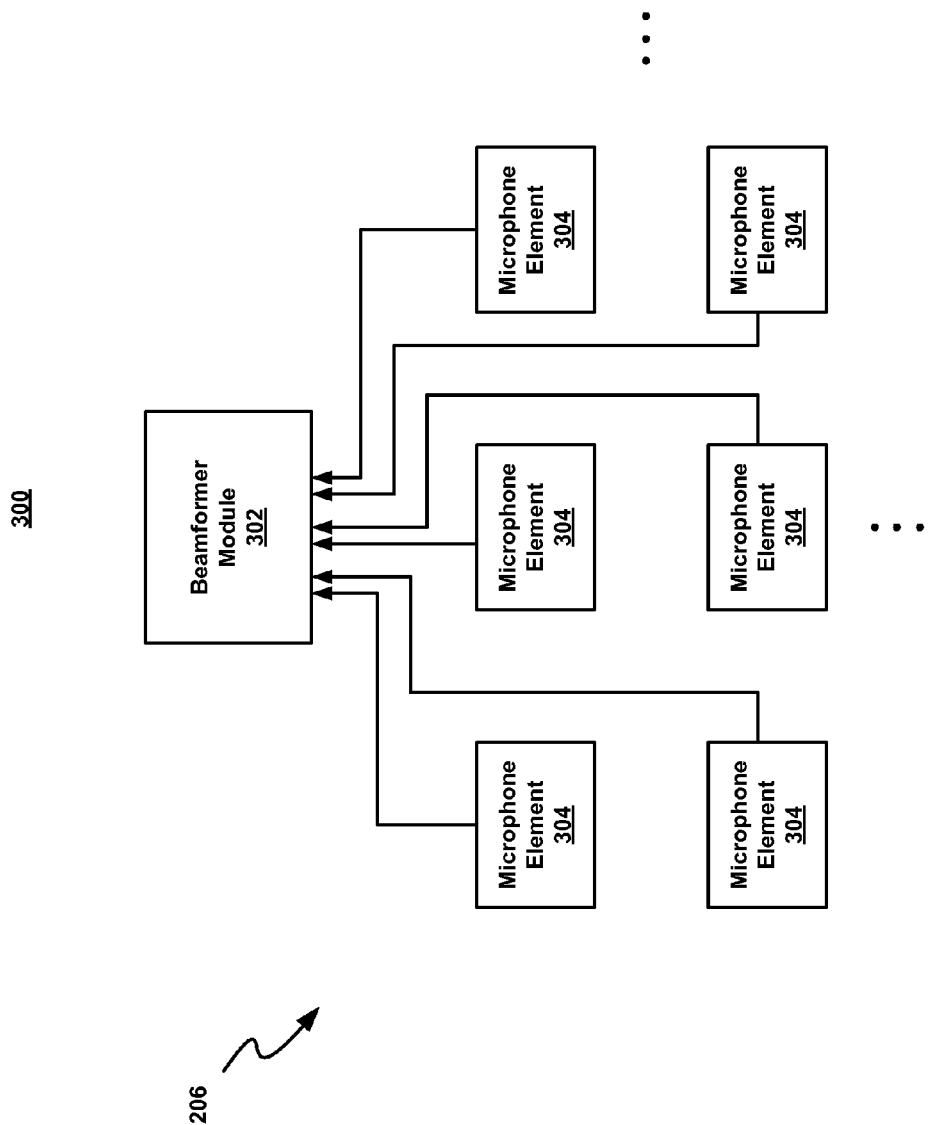
FIG. 3 illustrates a block diagram of a beamforming microphone consistent with an example embodiment of the present disclosure.

FIG. 3 illustrates a block diagram 300 of a beamforming microphone 206 consistent with an example embodiment of the present disclosure. Beamforming microphone 206 is shown to comprise an array of microphone elements 304 coupled to a beamforming module 302. The microphone elements 304 may include any device (known or later discovered) for capturing voice data of one or more speakers, and may have adequate digital resolution for speech analysis of the one or more speakers. Six elements 304 are shown for illustration simplicity but it will be appreciated that any number of elements 304 may be deployed in any suitable geometric layout and spacing. Each microphone element 304 may be configured to detect an audio signal. Beamforming module 302 may be configured to combine the signals from each element 304 with a suitable phase shift or time delay to create a gain in a desired direction (e.g., towards the speakers) resulting in a steerable audio beam. The phase shifts and/or time delays may be dynamically adjusted to steer the audio beam in real-time as required to improve the detection of the speech.

In some embodiments, two or more beamforming microphones 206 may be employed, for example, one for each user 102, 104. In some embodiments, adaptive noise cancellation techniques may also be employed to further improve the detected speech signals.

Figure 4:
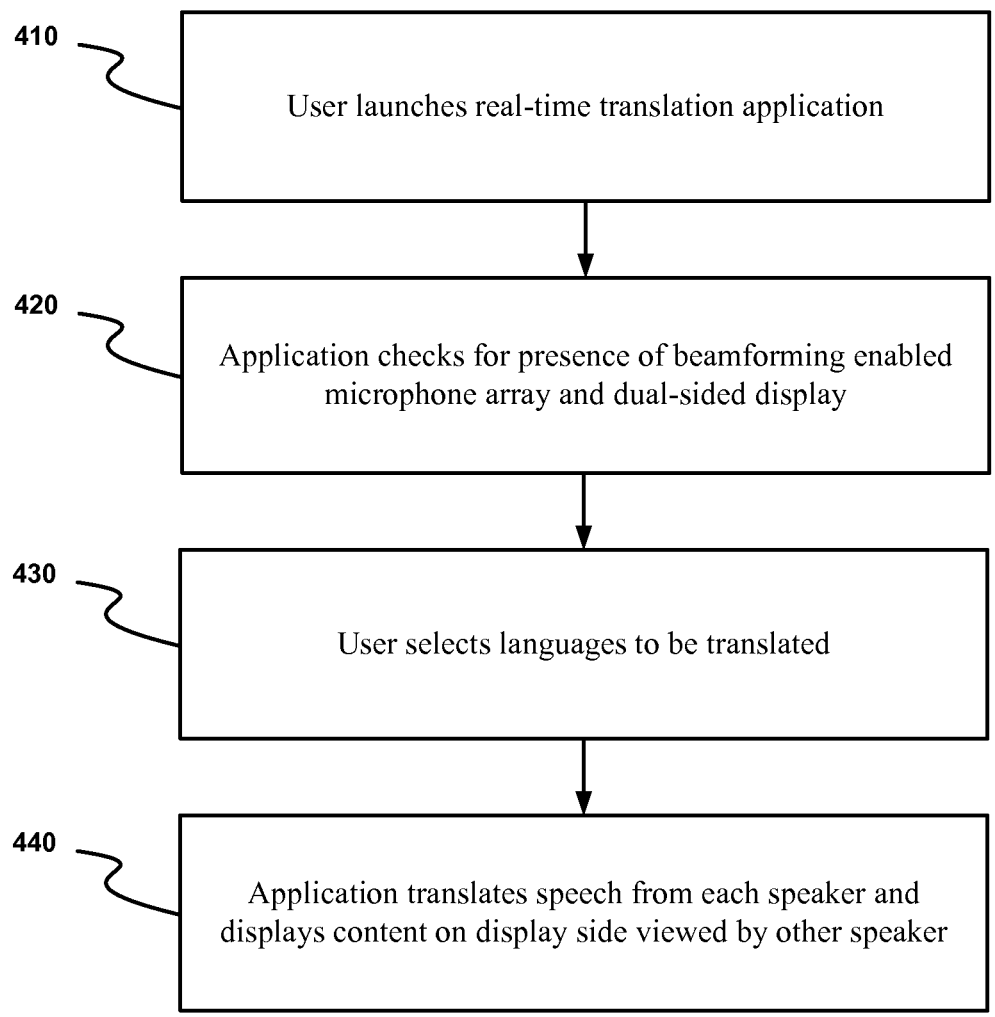
FIG. 4 illustrates a flowchart of operations of an example embodiment consistent with the present disclosure.

FIG. 4 illustrates a flowchart of operations 400 of an example embodiment consistent with the present disclosure. At operation 410, a user launches the real-time translation application. The user may be one of the speakers. At operation 420, the application checks for the presence or availability of a beamforming enabled microphone array and a dual-sided display element. At operation 430, the user selects the languages to be translated from each of the speakers. At operation 440, the application translates speech from each speaker and displays the translated content on the display element side viewed by the other speaker.

Figure 5:
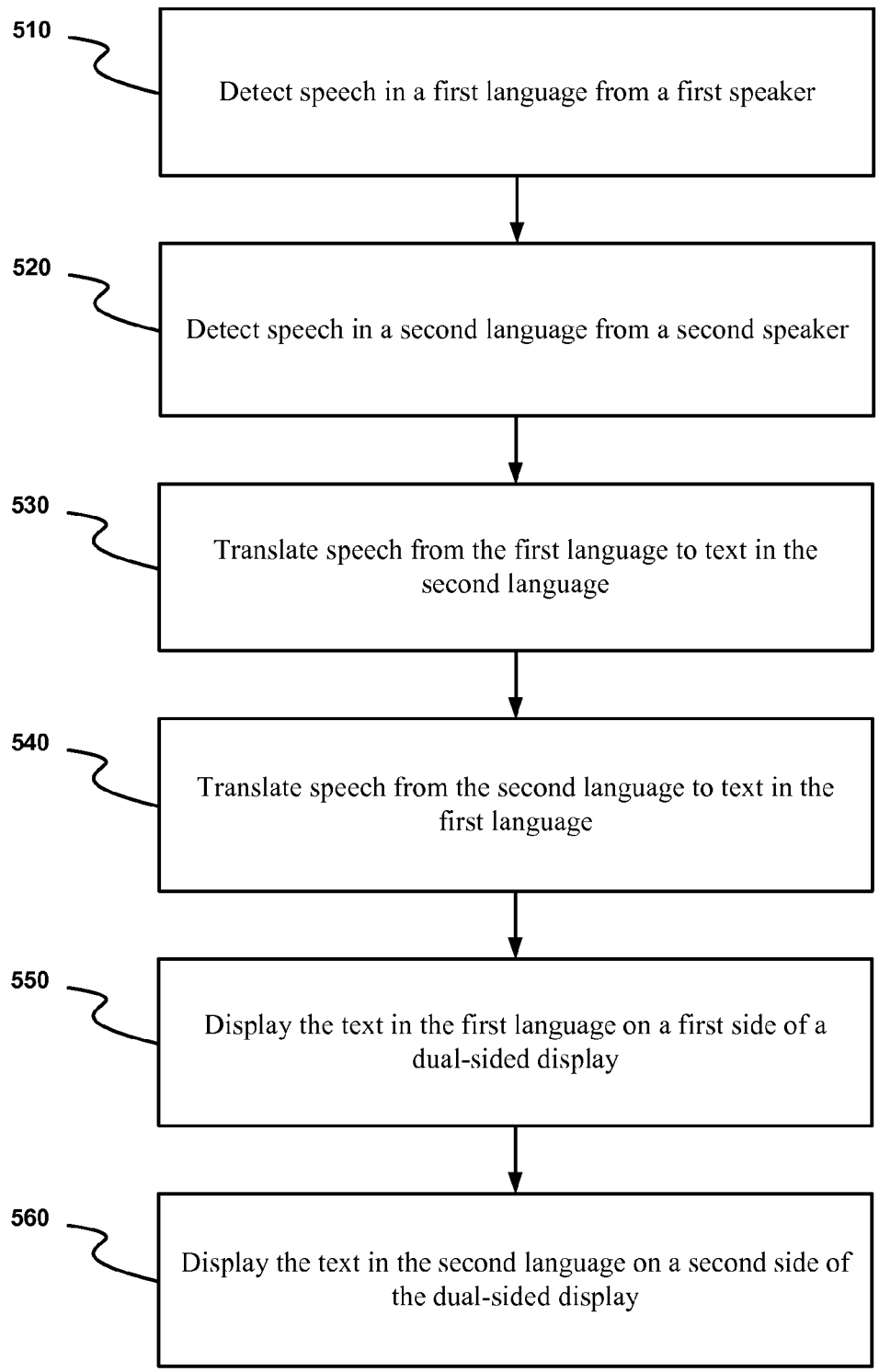
FIG. 5 illustrates a flowchart of operations of another example embodiment consistent with the present disclosure.

FIG. 5 illustrates a flowchart of operations 500 of another example embodiment consistent with the present disclosure. At operation 510, speech, in a first language, from a first speaker, is detected. At operation 520, speech, in a second language, from a second speaker, is detected. At operation 530, speech from the first language is translated to text in the second language. At operation 540, speech from the second language is translated to text in the first language. At operation 550, the text in the first language is displayed on a first side of a dual-sided display element. At operation 560, the text in the second language is displayed on a second side of the dual-sided display element. The dual-sided display element may be oriented so that first speaker views the first display element side and the second speaker views the second display element side.

Figure 6:
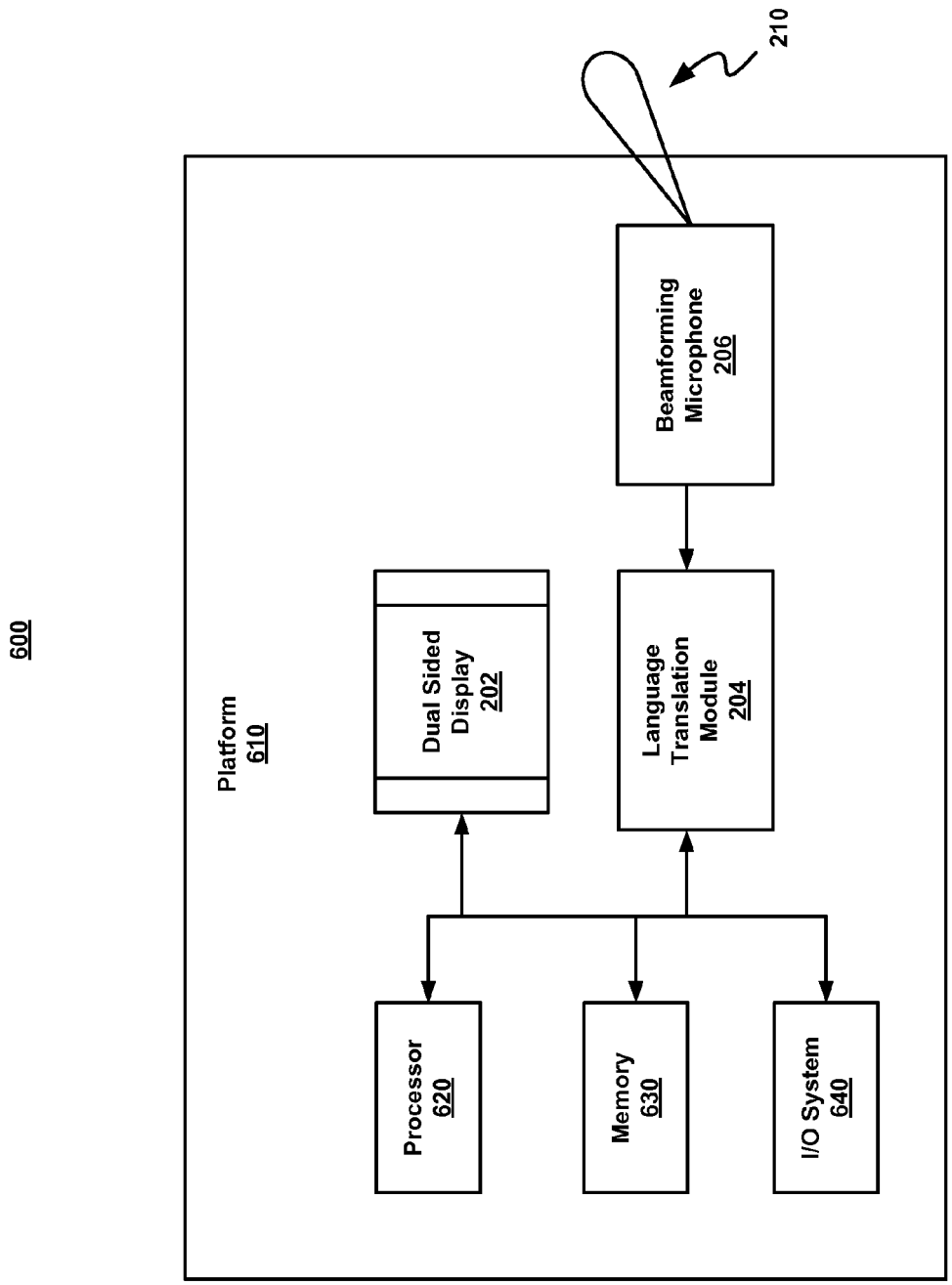
FIG. 6 illustrates a platform of one example embodiment consistent with the present disclosure.

FIG. 6 illustrates a system diagram 600 of a platform 610 of one example embodiment consistent with the present disclosure. Platform 610 may be a computing or communication device, such as, for example, a laptop computer, tablet, notebook, workstation, phone, smartphone, ultrabook or any other mobile computing device. Platform 610 may include a processor 620, memory 630, an input/output (I/O) system 640, a language translation module 204, a dual sided display element 202 and a beamforming microphone 206 as described previously. The I/O system 640 may include a keyboard, mouse, touchscreen, gesture input/detection or any other suitable I/O device. The beamforming microphone 206 may be configured to generate an audio beam pattern 210 in a desired direction, for example towards one or more speakers 102, 104.

Figure 7:
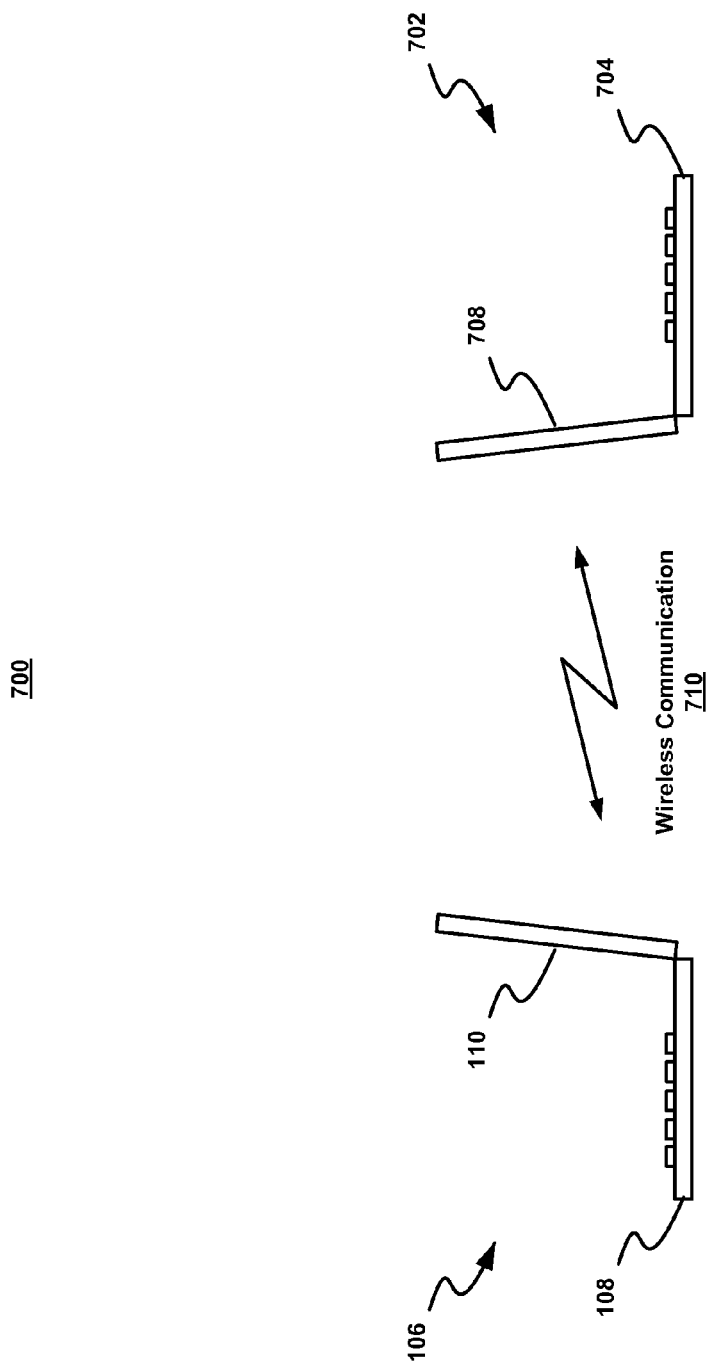
FIG. 7 illustrates a system diagram of another example embodiment consistent with the present disclosure.

FIG. 7 illustrates a system diagram 700 of another example embodiment consistent with the present disclosure. In this embodiment, two systems 106, 702 may be employed (e.g., a laptop, tablet, phone, smartphone, ultrabook or any other mobile computing device) as an alternative to the single system with dual sided screen described previously. Each system 106, 702 may be configured with a screen 110, 708 and keyboard or other input device 108, 704. The systems may communicate with each other through a wireless connection 710 which may be a Bluetooth, WiFi or other suitable communication mechanism or protocol (e.g., peer-to-peer communication). Language translation may be performed. The beamforming microphone and language translation capabilities may be provided on either or both systems. For example, one system may detect audio and transmit the audio over wireless communication link 710 for language translation on the second system. As another example, language may be translated on one system and the text may be transmitted over wireless communication link 710 to be displayed on the second system.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination as would be understood by one skilled in the art. Thus, not all of the operations of each of the flowcharts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk re-writables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry," as used in any embodiment herein, may comprise, for example, singly or in any combination, hard-wired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, methods, computer readable media and platforms to facilitate real-time language translation between two speakers.

The system may include an audio beamforming microphone configured to detect speech in a first language from a first speaker and to detect speech in a second language from a second speaker. The system of this example may also include a language translation module configured to translate the speech in the first language to text in the second language and to translate the speech in the second language to text in the first language. The system of this example may further include a display element configured with a first display element side and a second display element side and further configured to display the text in the first language on the first display element side and to display the text in the second language on the second display element side.

Another example system includes the forgoing components and the first display element side is oriented such that the first speaker views the first display element side and the second display element side is oriented such that the second speaker views the second display element side.

Another example system includes the forgoing components and the audio beamforming microphone is further configured to steer a first audio beam in a direction towards the first speaker and to steer a second audio beam in a direction towards the second speaker.

Another example system includes the forgoing components and the first and the second audio beams reduce background noise and improve language translation accuracy.

Another example system includes the forgoing components and the first audio beam enables detection of the speech from the first speaker and the second audio beam enables detection of the speech from the second speaker.

Another example system includes the forgoing components and further includes an input module to enable a user to configure the language translation module by selecting the first and the second languages from a plurality of languages available for translation.

According to another aspect there is provided a method. The method may include detecting speech in a first language from a first speaker. The method of this example may also include detecting speech in a second language from a second speaker. The method of this example may further include translating the speech in the first language to text in the second language. The method of this example may further include translating the speech in the second language to text in the first language. The method of this example may further include displaying the text in the first language on a first side of a dual-sided display element. The method of this example may further include displaying the text in the second language on a second side of the dual-sided display element.

Another example method includes the forgoing operations and the first display element side is oriented such that the first speaker views the first display element side and the second display element side is oriented such that the second speaker views the second display element side.

Another example method includes the forgoing operations and further includes steering a first audio beam in a direction towards the first speaker and steering a second audio beam in a direction towards the second speaker.

Another example method includes the forgoing operations and the first and the second audio beams reduce background noise and improve language translation accuracy.

Another example method includes the forgoing operations and the first audio beam enables detection of the speech from the first speaker and the second audio beam enables detection of the speech from the second speaker.

Another example method includes the forgoing operations and further includes selecting the first and the second languages from a plurality of languages available for translation.

According to another aspect there is provided at least one computer-readable storage medium having instructions stored thereon which when executed by a processor, cause the processor to perform the operations of the method as described in the examples above.

According to another aspect there is provided a platform. The platform may include a processor; an input/output module coupled to the processor; a memory coupled to the processor; an audio beamforming microphone coupled to the processor and configured to detect speech in a first language from a first speaker and to detect speech in a second language from a second speaker. The platform of this example may also include a language translation module coupled to the processor and configured to translate the speech in the first language to text in the second language and to translate the speech in the second language to text in the first language. The platform of this example may further include a display element coupled to the processor and configured with a first display element side and a second display element side and further configured to display the text in the first language on the first display element side and to display the text in the second language on the second display element side.

Another example platform includes the forgoing components and the first display element side is oriented such that the first speaker views the first display element side and the second display element side is oriented such that the second speaker views the second display element side.

Another example platform includes the forgoing components and the audio beamforming microphone is further configured to steer a first audio beam in a direction towards the first speaker and to steer a second audio beam in a direction towards the second speaker.

Another example platform includes the forgoing components and the first and the second audio beams reduce background noise and improve language translation accuracy.

Another example platform includes the forgoing components and the first audio beam enables detection of the speech from the first speaker and the second audio beam enables detection of the speech from the second speaker.

Another example platform includes the forgoing components and the platform is a laptop computing device, a tablet, a notebook or a smartphone.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system to facilitate language translation, said system comprising:
   a dual-sided display having a first display element and a second display element, said second display element opposite said first display element;
   a first audio beamforming microphone corresponding to a first user and a second audio beamforming microphone corresponding to a second user, wherein each of said first and second audio beamforming microphones include a plurality of microphone elements to detect speech of said first user and said second user and each of said microphone elements generating a signal corresponding to said detected speech;

beamforming circuitry to combine each of said signals from said plurality of microphone elements corresponding to said first audio beamforming microphone into a first steerable audio beam and to combine each of said signals from said plurality of microphone elements corresponding to said second audio beamforming microphone into a second steerable audio beam, said beamforming circuitry forming each of said first and second steerable audio beams by introducing a phase shift into at least one of said generated signals forming each of said first and second steerable audio beams, wherein each phase shift is dynamically adjusted; and language translation circuitry, wherein said language translation circuitry:

identifies a first voice pattern corresponding to speech of said first user in said first steerable audio beam;

identifies a second voice pattern corresponding to speech of said second user in said second steerable audio beam;

translates said speech of said first user from a first language to text in a second language;

translates said speech of said second user from said second language to text in said first language;

determines, based on said first and second steerable audio beams, whether said first display element or said second display element is displaying in a direction of said first user;

determines, based on said first and second steerable audio beams, whether said first display element or said second display element is displaying in a direction of said second user;

provides said text in said first language to said first display element when said first display element is determined to be displaying in said direction of said first user; and provides said text in said second language to said second display element when said second display element is determined to be displaying in said direction of said second user.

2. The system of claim 1, wherein said first audio beamforming microphone is further configured to steer said first steerable audio beam in towards said first user and said second audio beamforming microphone is further configured to steer said second steerable audio beam in towards said second user.

3. The system of claim 2, wherein said first and said second steerable audio beams are to reduce background noise and improve language translation accuracy.

4. The system of claim 1, further comprising input circuitry to enable each user to configure said language translation circuitry by selecting said first and said second languages from a plurality of languages available for translation.

5. One or more non-transitory computer-readable memories having instructions stored thereon which when executed by a processor result in the following operations to facilitate language translation, said operations comprising:

detecting, using a first audio beamforming microphone, speech in a first language from a first user;

detecting, using a second audio beamforming microphone, speech in a second language from a second user, wherein said first and said second audio beamforming microphones include a plurality of microphone elements, each microphone element generating a signal corresponding to said detected speech;

combining each of said signals from said plurality of microphone elements corresponding to said first audio beamforming microphone into a first steerable audio beam;

combining each of said signals from said plurality of microphone elements corresponding to said second audio beamforming microphone into a second steerable audio beam, wherein each of said steerable audio beams is formed by introducing a phase shift into at least one of said generated signals forming each of said first and second steerable audio beams, wherein each phase shift is dynamically adjusted;

identifying a first voice pattern corresponding to said speech of said first user in said first steerable audio beam;

identifying a second voice pattern corresponding to said speech of said second user in said second steerable audio beam;

translating said speech in said first language to text in said second language;

translating said speech in said second language to text in said first language;

determining, based on said first and second steerable audio beams, whether a first display element or a second display element of a dual-sided display is displaying in a direction of said first user;

determining, based on said first and second steerable audio beams, whether said first display element or said second display element is displaying in a direction of said second user;

displaying said text in said first language on said first display element of said dual-sided display when it is determined, that said first display element is displaying in said direction of said first user; and displaying said text in said second language on said second display element said dual-sided display when it is determined, that said second side is displaying in said direction of said second user, wherein said first display element is opposite said second display element.

6. The one or more non-transitory computer-readable memories of claim 5, further comprising the operation of steering said first steerable audio beam towards said first user and steering said second steerable audio beam towards said second user.

7. The one or more non-transitory computer-readable memories of claim 6, wherein said first and said second steerable audio beams reduce background noise and improve language translation accuracy.

8. The one or more non-transitory computer-readable memories of claim 5, further comprising the operation of selecting said first and said second languages from a plurality of languages available for translation.

9. A system comprising:

a processor;

input/output circuitry coupled to said processor;

a memory coupled to said processor;

a display coupled to said processor and having a first display element opposite a second display element;

a first and second audio beamforming microphone coupled to said processor and configured to detect speech in a first language from a first user and to detect speech in a second language from a second user, wherein said first and said second audio beamforming microphones include a plurality of microphone elements, each microphone element generating a signal corresponding to said detected speech;

beamforming circuitry to combine each of said signals from said plurality of microphone elements corresponding to said first audio beamforming microphone into a first steerable audio beam and to combine each of said signals from said plurality of microphone elements corresponding to said second audio beamforming microphone into a second steerable audio beam, said beamforming circuitry forming each of said steerable audio beams by introducing a phase shift into at least one of said generated signals forming each of said first and second steerable audio beams, wherein each phase shift is dynamically adjusted;

language translation circuitry coupled to said processor, said language translation circuitry to:

identify a first voice pattern corresponding to said speech of said first user in said first steerable audio beam;

identify a second voice pattern corresponding to said speech of said second user in said second steerable audio beam;

translate said speech of said first user from said first language to text in said second language;

translate said speech of said second user from said second language to text in said first language;

determine, based on said first and second steerable audio beams, whether said first display element or said second display element is displaying in a direction of said first user; and determine, based on said first and second steerable audio beams, whether said first display element or said second display element is displaying in a direction of said second user, wherein said display is configured to:

display said text in said first language on said first display element when said first display element is displaying in said direction of said first user; and display said text in said second language on said second display element when said second display element is displaying in said direction of said second user.

10. The system of claim 9, wherein said first and second audio beamforming microphones are further configured to steer said first steerable audio beam towards said first user and to steer said second steerable audio beam towards said second user.

11. The system of claim 10, wherein said first and said second steerable audio beams are to reduce background noise and improve language translation accuracy.

12. The system of claim 9, wherein said platform is selected from the group consisting of a laptop computing device, a tablet, a notebook and a smartphone.

* * * * *